(12) United States Patent
Kumar et al.

(10) Patent No.: US 9,640,333 B2
(45) Date of Patent: May 2, 2017

(54) HIGH SURFACE AREA CARBON MATERIALS AND METHODS FOR MAKING SAME

(71) Applicant: Georgia Tech Research Corporation, Atlanta, GA (US)

(72) Inventors: Satish Kumar, Atlanta, GA (US); Kishor Kumar Gupta, Duluth, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 369 days.

(21) Appl. No.: 14/042,842

(22) Filed: Oct. 1, 2013

(65) Prior Publication Data

US 2014/0092528 A1   Apr. 3, 2014

Related U.S. Application Data

(60) Provisional application No. 61/709,292, filed on Oct. 3, 2013.

(51) Int. Cl.
*H01G 11/32* (2013.01)
*H01G 9/00* (2006.01)
(Continued)

(52) U.S. Cl.
CPC ............ *H01G 11/32* (2013.01); *C01B 31/02* (2013.01); *C01B 31/08* (2013.01); *C01B 31/12* (2013.01);
(Continued)

(58) Field of Classification Search
CPC .......... H01G 9/00; H01G 9/0029; H01G 9/02; H01G 11/24; H01G 11/32; H01G 11/34; H01G 11/44
See application file for complete search history.

(56) References Cited

U.S. PATENT DOCUMENTS 7,875,219 B2    1/2011  Zhamu et al.
9,362,116 B2 *  6/2016  Kim .................. H01L 21/02565
(Continued)

FOREIGN PATENT DOCUMENTS

GB    2487036 A1      7/2012
WO    2013/066474 A9  5/2013
WO    2013/067280 A1  5/2013

OTHER PUBLICATIONS

Kumar: "Carbon Nanotube Based Electrochemical Supercapacitor Electrodes"; 2009.
(Continued)

*Primary Examiner* — Seahvosh Nikmanesh
(74) *Attorney, Agent, or Firm* — Bryan W. Bockhop; Bockhop Intellectual Property Law, LLC

(57) ABSTRACT

In a method of making a high surface area carbon material, a precursor organic material is prepared. The precursor organic material is subjected to a first elevated temperature while applying a gaseous purge thereto for a first predetermined time. The precursor organic material is subjected to a second elevated temperature while not applying the gaseous purge thereto for a second predetermined time after the first predetermined time. A high surface area carbon material includes carbon and has a surface area in a range between 3029 $m^2/g$ to 3565 $m^2/g$ and a pore volume in a range between 1.66 $cm^3/g$ and 1.90 $cm^3/g$. The high surface area carbon material may be employed in an electrode for a supercapacitor.

9 Claims, 2 Drawing Sheets

(51) Int. Cl.
*C01B 31/08* (2006.01)
*H01G 11/24* (2013.01)
*H01G 11/34* (2013.01)
*H01G 11/44* (2013.01)
*C01B 31/02* (2006.01)
*C01B 31/12* (2006.01)

(52) U.S. Cl.
CPC ............ *H01G 11/24* (2013.01); *H01G 11/34* (2013.01); *H01G 11/44* (2013.01); *C01P 2006/12* (2013.01); *C01P 2006/14* (2013.01); *Y02E 60/13* (2013.01); *Y10T 428/2982* (2015.01)

(56) References Cited

U.S. PATENT DOCUMENTS

| | | |
|---|---|---|
| 2009/0053512 A1 | 2/2009 | Pyun et al. |
| 2010/0110611 A1* | 5/2010 | Gadkaree ............... C01B 31/10 361/502 |
| 2011/0183180 A1 | 7/2011 | Yu et al. |
| 2012/0099244 A1 | 4/2012 | Lee et al. |
| 2013/0058008 A1 | 3/2013 | Kim et al. |
| 2013/0114183 A1 | 5/2013 | Lee et al. |
| 2013/0120908 A1 | 5/2013 | Eweka |
| 2013/0170101 A1 | 7/2013 | Lee et al. |
| 2014/0239292 A1* | 8/2014 | Kim .................. H01L 21/02565 257/43 |

OTHER PUBLICATIONS

Tao Liu: "SWNT/PAN composite film-based supercapacitors"; May 31, 2003; Letters to the Editor / Carbon 41 (2003) 2427-2451; Elsevier Ltd.

Tran: "Fabrication of porous carbon nanofibers with adjustable pore sizes as electrodes for supercapacitors"; 2013; Journal of Power Sources 235 (2013) 289e296; Elsevier Ltd.

* cited by examiner

HIGH SURFACE AREA CARBON MATERIALS AND METHODS FOR MAKING SAME

CROSS-REFERENCE TO RELATED APPLICATION(S)

This application claims the benefit of U.S. Provisional Patent Application Ser. No. 61/709,292, filed Oct. 3, 2012, the entirety of which is hereby incorporated herein by reference.

STATEMENT OF GOVERNMENT INTEREST

This invention was made with government support under agreement No. FA9550-09-1-0150, awarded by the Department of the Air Force. The government has certain rights in the invention.

BACKGROUND OF THE INVENTION

1. Field of the Invention

The present invention relates to methods of making carbon materials and, more specifically, to methods of making high surface area carbon materials.

2. Description of the Related Art

One of the outstanding challenges in the field of supercapacitors is to achieve high energy density. To increase energy density in a supercapacitor, electrodes will require higher surface areas with controlled pore size distributions, thereby promoting massive charge accumulation near the electrode/electrolyte interfaces. The greatest advantage of supercapacitors over batteries is that they have high power density, enabling them to be charged in fraction of the time required to charge batteries. Some of the present applications of supercapacitors include: harvesting kinetic energy to store breaking energy in hybrid vehicles; and load leveling, i.e. delivering power above the average value when needed and to store excess power when the demand is below average. Improvements in energy density of supercapacitors could lead to widespread use where high energy density along with very high charge and discharge rates is required, e.g., in such applications as aerospace, industrial, transportation, utility, and consumer electronics.

Supercapacitors are also known as electric double layer capacitors (EDLC) or ultracapacitors. In EDLC, on application of voltage across its electrodes, charge accumulates in the form of ions at the surface of electrodes, forming an electrode-electrolyte double layer. Energy density of EDLC can be increased by increasing the charge at the surface, which depends on the accessible surface area to these ions. High surface area electrodes promote massive charge accumulation. Some of the other factors contributing to EDLC energy density are pore size, choice of electrolyte, and electrode materials. Micro pores (with a pore diameter of <2 nm) and meso pores (with a pore diameter in the range of 2 nm to 50 nm) are important for smooth propagation of solvated ions and high electrochemical properties.

Polyacrylonitrile (PAN)-based activated carbons are generally amorphous carbon with high surface area and good adsorption capacity. The activation process for PAN can be achieved by either physical or chemical approaches. Chemical activation tends to generate predominantly micro-pores with narrow pore size distribution whereas physical activation tends to generate predominantly micro and meso-pores with wide pore size distribution.

Current methods of generating carbonaceous materials through activating PAN materials results in surface areas below 2300 $m^2/g$ and relatively low pore volumes. However in applications such as supercapacitors, batteries, fuel cells, gas absorption and catalysts, surface areas of greater than 3000 $m^2/g$ would be highly desirable.

Therefore, there is a need for carbon materials exhibiting increased surface areas.

SUMMARY OF THE INVENTION

The disadvantages of the prior art are overcome by the present invention which, in one aspect, is a method of making a high surface area carbon material, in which a precursor organic material is prepared. The precursor organic material is subjected to a first elevated temperature while applying a gaseous purge thereto for a first predetermined time. The precursor organic material is subjected to a second elevated temperature while not applying the gaseous purge thereto for a second predetermined time after the first predetermined time.

In another aspect, the invention is a high surface area carbon material comprising carbon and having a surface area in a range between 3029 $m^2/g$ to 3565 $m^2/g$ and a pore volume in a range between 1.66 $cm^3/g$ and 1.90 $cm^3/g$.

In yet another aspect, the invention is a supercapacitor that includes a first electrode and a second electrode. The first electrode includes a conductor layer and a surface layer applied to the conductor layer. The surface layer includes a porous carbon material having a surface area in a range between 3029 $m^2/g$ to 3565 $m^2/g$ and a pore volume in a range between 1.66 $cm^3/g$ and 1.90 $cm^3/g$. The second electrode is disposed oppositely from the first electrode and includes a conductor layer and a surface layer applied to the conductor layer. The surface layer includes a porous carbon material having a surface area in a range between 3029 $m^2/g$ to 3565 $m^2/g$ and a pore volume in a range between 1.66 $cm^3/g$ and 1.90 $cm^3/g$. A membrane separates the 1st electrode from the 2d electrode and an electrolyte is disposed between the first electrode and the second electrode so as to be in chemical communication with the first surface layer and the second surface layer.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
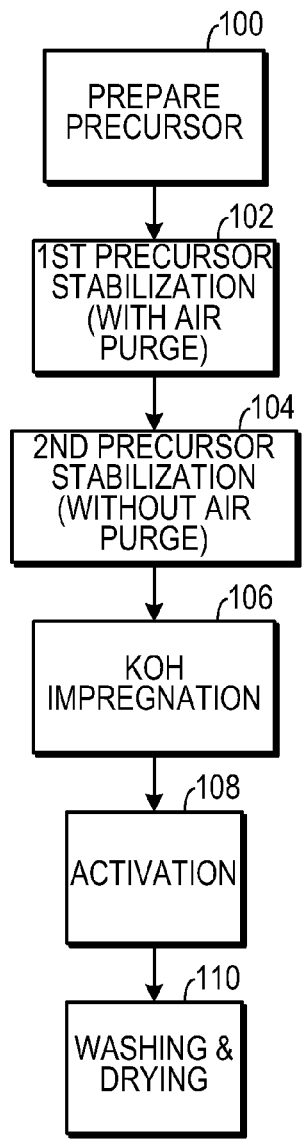
FIGS. 1A-1C are a series of flowcharts demonstrating methods of making high surface area materials.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1A, in one embodiment of a method for making a high surface area carbon material, a precursor is prepared 100. Typically, an organic polymer such as polyacrylonitrle-co-methacrylate (PAN) is employed. (In one example, homopolymer PAN is used and in another example, copolymer PAN is used. Examples of copolymers include but are not limited to polyacrylonitrile-co-methacrylic acid, polyacrylonitrile-co-methyl acrylate, polyacrylonitrile-co-itaconic acid, polyacrylonitrile-co-itaconic acid-co-methacrylic acid, polyacrylonitrile-co-methyl methacrylate.) In one example, a PAN powder is used and in another example, a PAN film is used. A first precursor stabilization with an air purge 102 is performed. A second precursor stabilization without the air purge 104 is performed. In one example, both the first precursor stabilization step 102 and the second precursor stabilization step 104 were performed at 285° C. In the first precursor stabilization with an air purge 102, air is introduced into the reaction chamber and in the second precursor stabilization without the air purge 104 no air is added to the reaction chamber, but any gasses that form during this step are allowed to vent out of the chamber.

In one experimental embodiment, 300 mg of PAN was dissolved in 30 mL DMF (in other examples, one several other solvents may be used, such as DMAc or DMSO) at 80° C. for one hour. The material was cast as a film on a hot (80° C.) glass substrate for about 12 hours at a 15 psi vacuum. The film was separated from the glass and dried at 80° C. for 48 hours, resulting in a film having a thickness of about 25 µm. In one embodiment, the first stabilization step included subjecting such a PAN film to an air purge for 10 hours and then a second stabilization step subjecting the PAN film to an environment without an air purge for 6 more hours, both at 285° C. In another embodiment, the first stabilization step included subjecting such a PAN film to an air purge for 16 hours and then a second stabilization step subjecting the PAN film to an environment without an air purge for 6 more hours, both at 285° C. In yet another embodiment, the first stabilization step included subjecting such a PAN powder to an air purge for 16 hours and then a second stabilization step subjecting the PAN powder to an environment without an air purge for 6 more hours, both at 285° C. The thus stabilized materials were then soaked in 6M KOH for 24 hours and the resulting KOH-soaked materials were activated at 800° C. for 1 hour in an inert (Ar) environment (in which the heating rate from room temperature to 800° C. was 5° C. per minute). The resulting activated materials were washed in boiling water four times and dried at 80° C. in a vacuum oven for 24 hours. The surface area of this carbon material was measured by nitrogen gas absorption in a range from 3029 m$^2$/g to 3565 m$^2$/g. In other experimental embodiments, the activated carbon materials were prepared into two different forms (film and powder). PAN films were stabilized at different residence time to investigate the effect on the surface area and pore structure, further on the resulting electrochemical properties. The surface area and pore structure analysis for the activated carbon materials were done by nitrogen gas adsorption-desorption at 77K using ASAP 2020 (Micromeritics Inc). For the analysis, the activated carbon materials were degassed at 90° C. for 16 hours. BET (Brunauer, Emmet, and Teller) analysis for surface area and density functional theory (DFT) analysis for pore volume and pore size distribution were conducted.

In one embodiment, the stabilized precursor material is soaked in a KOH solution (or other ionic solution) for a predetermined amount of time (such as 24 hours) to impregnate the stabilized precursor material with KOH ions 106. The material is then activated 108 by subjecting it to an elevated temperature (e.g., 800° C.) for an amount of time (e.g., 1 hour) to remove volatile components from the now-carbonized material. The high surface area carbon is then washed 110 (e.g., in boiling water) and dried (e.g., at 80° C. in a vacuum for 24 hours). At this stage, the material is now high surface area carbon.

As shown in FIG. 1B, the precursor material is carbonized 112 without KOH impregnation and then activated 114 by subjecting it to an elevated temperature (e.g., 800° C.) for an amount of time (e.g., 1 hour).

Figure 2:
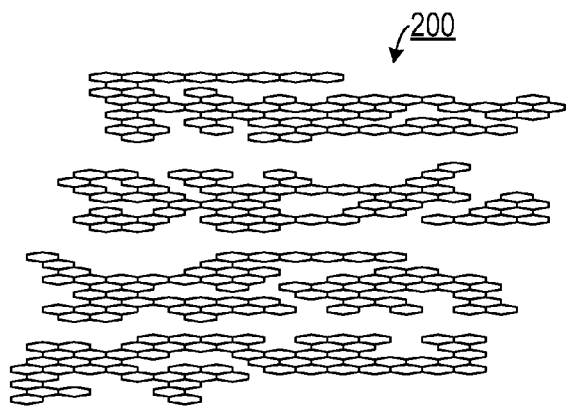
FIG. 2 is a schematic diagram of a high surface area carbon material.
Figure 3:
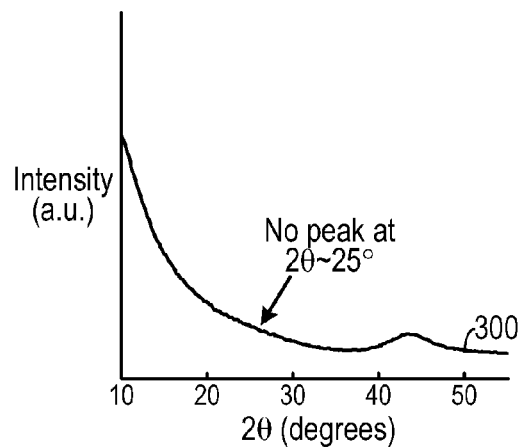
FIG. 3 is a graph showing an x-ray diffraction measurement of a KOH-activated high surface area carbon powder.

A resulting carbon structure 200 is shown schematically in FIG. 2 and an x-ray diffraction measurement 300 of a KOH-activated high surface area carbon powder is shown in FIG. 3. As can be seen, this measurement shows no diffraction 2θ peak corresponding to graphite [0002] spacing, which indicates that there is no substantial graphene stacking in the structure.

In the embodiment shown in FIG. 1C, carbonaceous powder was also made by stabilizing PAN powder at 285° C. (heating 1° C./min.) for 16 hours in the presence of air 102 and 6 hours after air purging stopped 104. Stabilized powder was carbonized 112 at 1100° C. (heating from room temperature to 1100° C. at 5° C./min.) in the presence of argon. Such carbonized PAN powder demonstrated a BET surface area 2298 m$^2$/g. This carbonaceous material did not demonstrate the presence of micro pores (<2 nm), and the majority of pores were in the range of 2 nm to 50 nm (meso pores).

Figure 4:
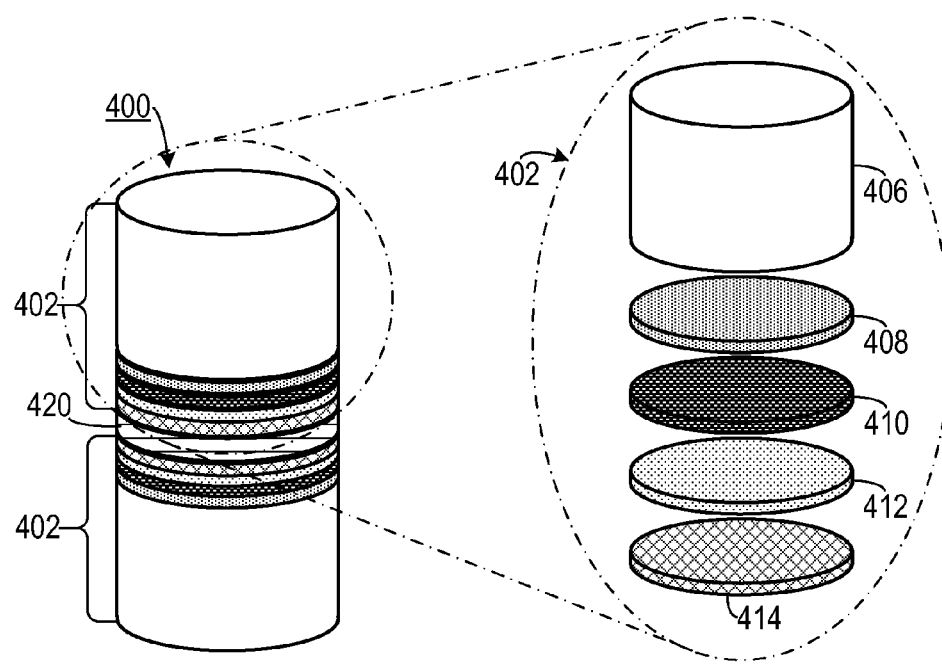
FIG. 4 is a schematic diagram of a portion of a supercapacitor.

As shown in FIG. 4, the high surface area carbon 410 produced by this method can be used in electrodes 402 employed in supercapacitors 400 and other applications requiring high surface area materials. In one embodiment of the supercapacitor application, the electrodes 402 include a layer 408 of 0.75 mg of carbon nanotubes (CNTs), a layer 410 of 4 mg activated PAN powder mixed with 1.0 mg of CNTs, a layer 412 of 0.25 mg of CNTs, and a layer of cellulose filter paper 414. The electrodes 402 are disposed oppositely from each other and an electrolyte 420 (such as a KOH solution) is disposed between the electrodes 402.

While the as-prepared activated PAN films were used directly as electrodes for a supercapacitor cell 400, the activated PAN powder-based electrode 402 was prepared using CNTs to improve electrical conductivity and to improve the structural integrity of the activated PAN powder 410. The CNTs were sonicated in DMF for 24 hours at the concentration of 1 mg/300 mL and the activated PAN powder was mixed with CNT dispersion (activated PAN powder: CNT=4:1 by weight) by sonication for 30 minutes. Then, the dispersion was filtered using cellulose filter paper (1 µm pore size). Before use as an electrode, the activated PAN powder/CNT film was vacuum dried at 100° C. for 4 days.

In one experimental embodiment, the prepared electrodes were separated by a non-conducting porous polypropylene membrane (Celgard 3400, 0.117×0.042 µm) and sandwiched between nickel current collectors. The electrodes and membrane were soaked in the electrolyte solution for 30 min prior to cell assembly. For the activated PAN film-based electrode, either aqueous KOH (6 M) or an ionic/organic (BMIMBF$_4$/AN) liquid were used as an electrolyte, whereas ionic liquid EMIMBF$_4$ was used for the activated PAN powder/CNT-based electrode embodiment.

In experimental embodiments, chemical activation using KOH was adopted for various PAN materials (film and powder), leading to the average pore size of 2.5 nm with surface area exceeding 3500 m$^2$/g. In addition, electrolytes for supercapacitors have a wide operating voltage range and remain stable at high temperature. Ionic liquids provided wide voltage range and stability at higher temperature than aqueous electrolytes. Therefore, different types of ionic liquid electrolytes (BMIMBF$_4$ and EMIMBF$_4$) were also used in these embodiments, along with KOH aqueous electrolyte. The electrode made from the high surface area carbonaceous fragments exhibited highest density (which was measured to be in a range of 40 Wh/kg to 100 Wh/kg when using EMIMBF$_4$).

In various embodiments, high surface area carbon materials exhibited surface areas in the range of between 3029 m$^2$/g to 3565 m$^2$/g and pore volumes of between 1.66 cm$^3$/g to 1.90 cm$^3$/g, with micro pore percentages of between 31% to 38% and meso pore percentages of between 62% to 68%.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A method of making a high surface area carbon material, comprising the steps of:
    (a) preparing a precursor organic material in a form selected from a list consisting of: a film, a fiber and a powder;
    (b) subjecting the precursor organic material to a first elevated temperature while applying a gaseous purge thereto for a first predetermined time;
    (c) subjecting the precursor organic material to a second elevated temperature while not applying the gaseous purge thereto for a second predetermined time after the first predetermined time, thereby generating a heat treated precursor organic material;
    (d) soaking the heat treated precursor organic material in an inorganic compound for a third predetermined time after the second predetermined time;
    (e) subjecting the heat treated precursor organic material to a third elevated temperature for a fourth predetermined time after the third predetermined time, so as to dry the heat treated precursor organic material; and
    (f) activating the heat treated precursor organic material so as to generate pores therein by subjecting the precursor organic material to a fourth elevated temperature for a fifth predetermined time after the fourth predetermined time.

2. The method of claim 1, wherein the precursor organic material comprises a material selected from a group of materials consisting of: a homopolymer polyacrylonitrile (PAN) film, a homopolymer polyacrylonitrile (PAN) powder, a copolymer polyacrylonitrile (PAN) film, a copolymer polyacrylonitrile (PAN) powder, and combinations thereof.

3. The method of claim 1, wherein the inorganic material comprises an ionic material.

4. The method of claim 3, wherein the ionic material comprises KOH.

5. The method of claim 1, wherein the first elevated temperature is 285° C., wherein the second elevated temperature is 285° C., and wherein the third elevated temperature is 800° C.

6. The method of claim 1, wherein the activating step occurs in an inert environment.

7. The method of claim 1, further comprising the steps of:
    (a) washing the organic material; and
    (b) drying the organic material after the washing step.

8. The method of claim 1, wherein step of subjecting the precursor organic material to a first elevated temperature occurs in a reaction chamber and wherein the gaseous purge comprises forcing air into the reaction chamber.

9. The method of claim 1, wherein the step of subjecting the precursor organic material to a second elevated temperature while not applying the gaseous purge includes venting gases produced by the precursor organic material but not introducing any additional gases to the precursor organic material.

* * * * *